E. A. KEASEY.
HOG TROUGH.
APPLICATION FILED MAR. 29, 1915.
1,182,178.
Patented May 9, 1916.
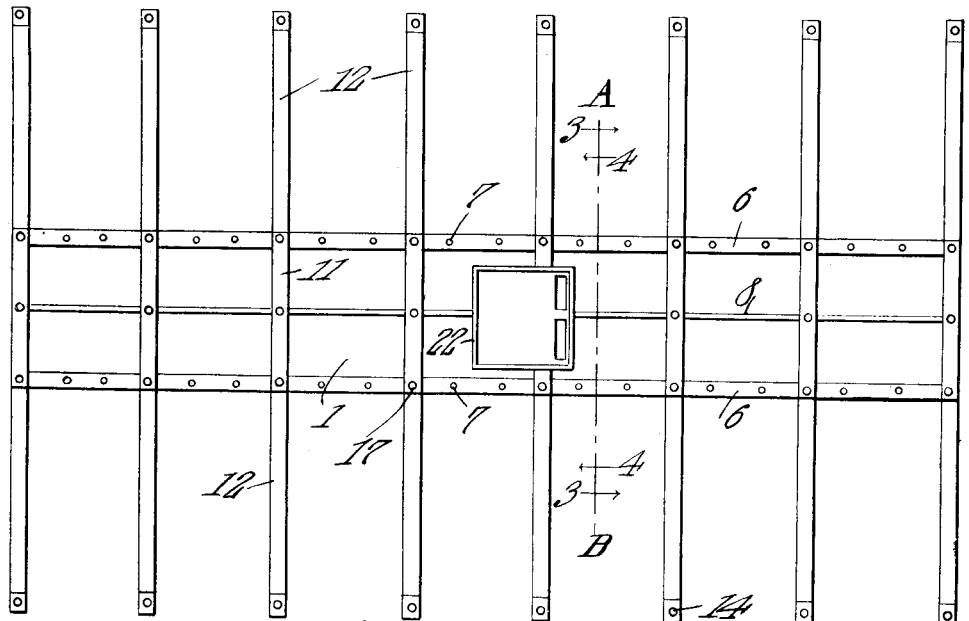
Fig. 1.
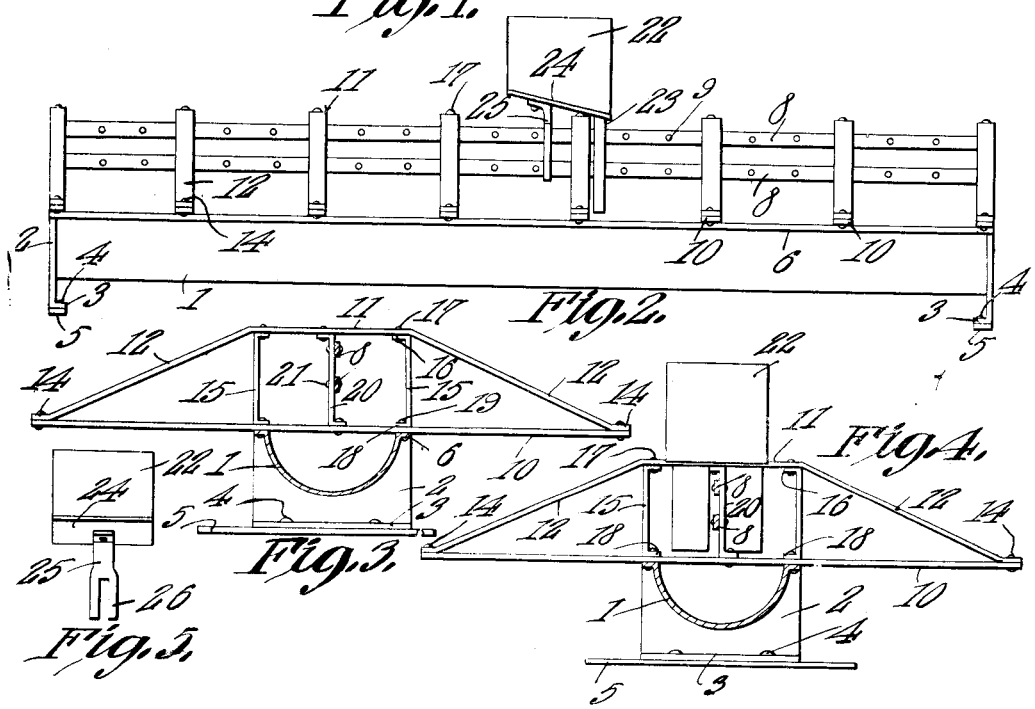
Witnesses
J. R. Turner
R. L. Parker
E. A. Keasey, Inventor
by C. A. Snow & Co.,
Attorneys

UNITED STATES PATENT OFFICE.

ENOS A. KEASEY, OF LIGONIER, INDIANA.

HOG-TROUGH.

1,182,178.  Specification of Letters Patent.  Patented May 9, 1916.

Application filed March 29, 1915. Serial No. 17,854.

*To all whom it may concern:*

Be it known that I, ENOS A. KEASEY, a citizen of the United States, residing at Ligonier, in the county of Noble and State of Indiana, have invented a new and useful Hog-Trough, of which the following is a specification.

The device forming the subject matter of this application is a watering trough adapted primarily but not exclusively to be employed for the purpose of feeding and watering swine.

The invention aims to provide a device of the type above mentioned having a plurality of transverse frames adapted to be moved laterally with respect to each other, thereby to effect a proper separation of the animals feeding out of the trough.

The invention aims to provide novel means for upholding these transverse frames and for maintaining the same in proper relation with respect to each other and with respect to the trough.

The invention aims to provide novel means whereby water, swill and the like, may be deposited in the trough.

It is within the scope of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—Figure 1 shows the invention in top plan; Fig. 2 is a side elevation; Fig. 3 is a cross section on the line A—B of Fig. 1, looking in the direction of the arrows 3; Fig. 4 is a cross section on the line A—B of Fig. 1, looking in the direction of the arrows 4; Fig. 5 is a fragmental rear elevation of the receptacle whereby material is deposited in the trough.

The device herein disclosed preferably is fashioned from metal throughout and embodies a trough 1 having end plates 2 provided with laterally projecting flanges 3 united by means of securing elements 4 with feet 5 which project beyond the vertical edges of the end plates 2. In its edges, the trough 1 is equipped with outstanding flanges 6. These flanges 6 are provided with openings 7.

The invention contemplates the use of a connecting member in the present instance disclosed in the form of a pair of parallel bars 8 lying above the trough 1. In these bars 8 openings 9 are formed, as clearly shown in Fig. 2, the openings 9 being in vertical planes with the openings 7 in the flanges 6 of the trough for a purpose which will be set forth hereinafter.

The invention comprises a plurality of transverse frames, adapted to be adjusted toward and away from each other, longitudinally of the trough 1. The frames are composite structures, each comprising a bottom bar 10 and a top bar 11, the ends of which are downwardly inclined and rest upon extremities of the bottom bars 10, the inclined ends of the top bars 11 being indicated by the reference characters 12. By means of securing elements 14 the extremities of the inclined ends of the top bars 11 are assembled with the end of the base bars 10. Extended vertically between the base bars 10 and the top bars 11 are outer braces 15 having transversely projecting feet 16 united with the top bars 11 by means of securing elements 17. At the lower end of the braces 15, are transversely projecting feet 18. These feet 18 are united with the bottom bar 10 by means of securing elements 19 and in this connection it is to be observed that the securing elements 19 are adapted to register in any of the openings 7 in the flanges 6 of the trough. Disposed between the outer braces 15 of each pair is an intermediate brace 20, the brace 20 being united by means of securing elements 21 with longitudinal bars 8, the securing elements 21 being adapted to be mounted in any of the openings 9 which, as clearly shown in Fig. 2 are located in the longitudinal bars 8. By means of securing elements 27, the extremities of the intermediate braces 20 are united with the top bar 11 and with the base of the bottom bar 10.

It will now be understood that since the securing elements 21 which are carried by the intermediate braces 20 may be mounted in any of the openings 9 of the longitudinal bars 8, and since the securing elements 19 which unite the lower end of the outer braces 15 with the bottom bar 10 may be mounted in any of the openings 7 in the flanges 6 of the trough 1, the transverse frames comprising the parts 10 and 11 may be moved toward and away from each other, longitudinally of the trough, thereby adjusting the spaces between the frames and making the device efficient for use in connection with animals of different sizes.

The invention contemplates the use of a receptacle 22 which, intermediate its ends, is supported by one of the transverse frames 10—11. At one end, the receptacle 22 is provided with depending spouts 23 discharging into the trough 1 and located upon opposite sides of the longitudinal bars 8, the bottom 24 of the receptacle 22 being inclined so that the contents of the receptacle will be discharged into the spouts 23. Fixed to and depending from the bottom 24 of the receptacle 22 is a support which may be in the form of a fork 25 including bifurcations 26 straddling the bars 8.

From the foregoing it will be seen that the receptacle 22 is so mounted that its contents may be discharged into the trough 1, the bifurcations 26 of the fork 25 and the spouts 23, being located upon opposite sides of the longitudinal bars 8, serving to prevent an undue lateral or swinging movement of the receptacle. The construction, however, is such that the receptacle 22 is movably mounted and may be lifted off at any time.

Having thus described the invention, what is claimed is:—

1. In a device of the class described, a trough; a connecting member extended longitudinally of the trough; frames extended transversely of the trough and the connecting member; means for securing the frames to the connecting member; a receptacle discharging into the trough; and a fork carried by the receptacle and straddling the connecting member.

2. In a device of the class described, a trough; a connecting member extended longitudinally of the trough; frames disposed transversely of the trough and the connecting member; means for securing the frames to the connecting member; a receptacle; spouts communicating with the receptacle and discharging in the trough, the spouts being located on opposite sides of the connecting member; and a fork carried by the receptacle, the fork straddling the connecting member.

3. In a device of the class described, a trough; a connecting member disposed longitudinally of the trough; frames disposed transversely of the connecting member and the trough; means for securing the frames to the connecting member; a receptacle supported on one frame and discharging into the trough; and a support assembled with the receptacle and engaging the connecting member to one side of said frame.

4. In a device of the class described, a trough; bottom bars disposed transversely of the trough and projecting therebeyond; upwardly extended top bars having their ends secured to the bottom bars; outer braces extended between the top bars and the bottom bars and disposed adjacent the edges of the trough; intermediate braces extended between the top bars and the bottom bars and located between the outer braces; and a bar extended longitudinally of the trough and united with the intermediate braces.

In testimony that I claim the foregoing as my own, I have hereto affixed my signature in the presence of two witnesses.

ENOS A. KEASEY.

Witnesses:
  CHRIST. D. RICE,
  FRED BEQULER.